UNITED STATES PATENT OFFICE.

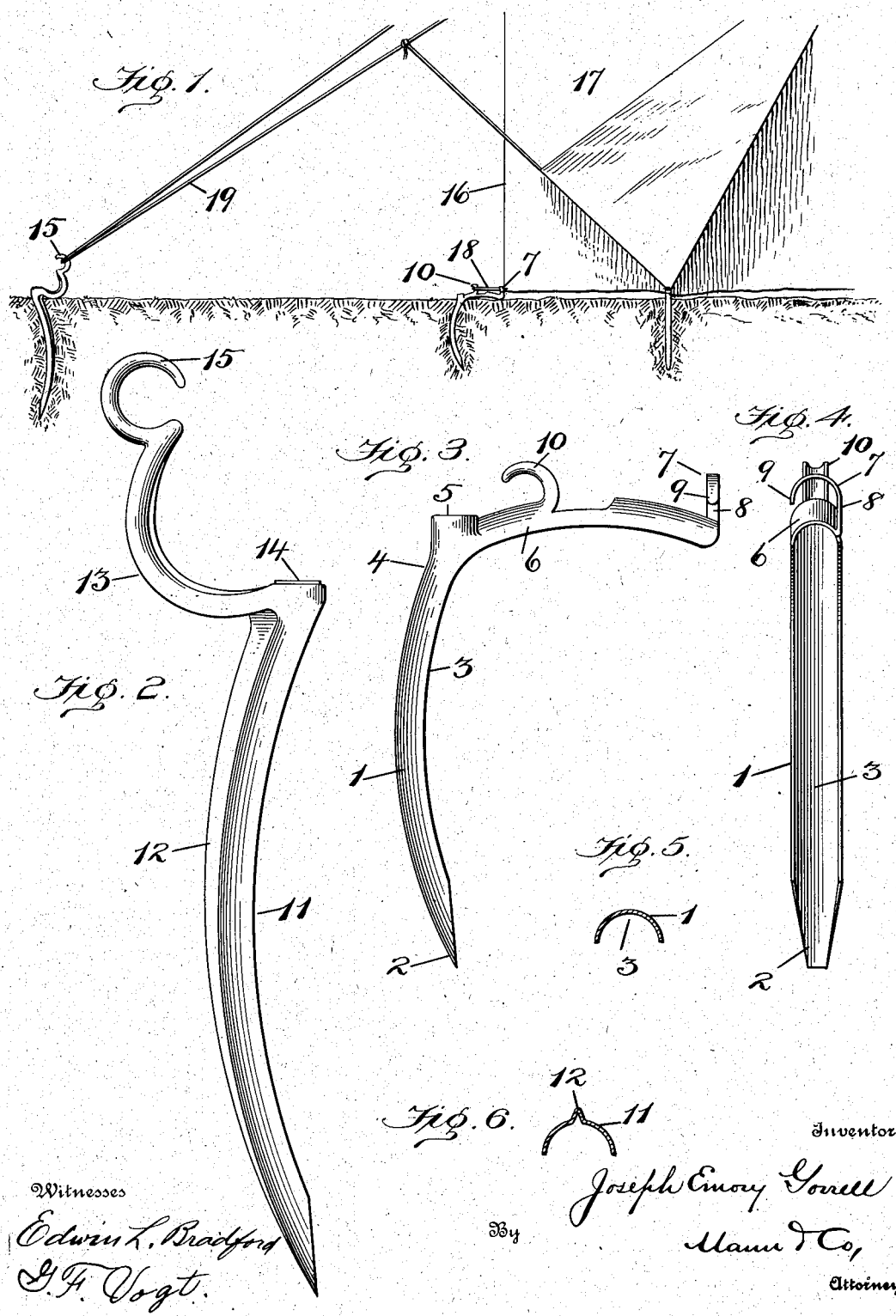

JOSEPH EMORY GORRELL, OF BALTIMORE, MARYLAND.

TENT-PEG.

No. 827,438.    Specification of Letters Patent.    Patented July 31, 1906.

Application filed May 26, 1905. Serial No. 262,463.

*To all whom it may concern:*

Be it known that I, JOSEPH EMORY GORRELL, a citizen of the United States, residing at 1019 North Caroline street, Baltimore city, in the State of Maryland, have invented certain new and useful Improvements in Tent-Pegs, of which the following is a specification, reference being had to the accompanying drawings, forming part thereof.

My invention relates to improvements in tent-pegs, and has for its object to provide a peg of such construction that it may be readily driven into the ground or removed therefrom, but which will receive pulling strains in such a way as to prevent their withdrawal from the earth, and which will be cheap and durable.

The accompanying drawings illustrate the invention, in which—

Figure 1 illustrates an elevation of a portion of a tent which is secured in place by means of my improved pegs. Fig. 2 illustrates a side elevation of a tent-peg formed in accordance with my invention. Figs. 3 and 4 illustrate two elevations of another peg formed in accordance with my invention. Fig. 5 shows a cross-sectional view of the peg as would appear on the line 5 5 of Fig. 4, and Fig. 6 is a similar view of the peg shown in Fig. 2 as would appear on the line 6 6 of said figure.

Referring to the drawings by numerals, 1 designates the stem of the peg, which is curved in a longitudinal direction and the lower end 2 of which is pointed, so as to enter the ground easily. In addition to the longitudinal curve this stem is provided with a concave side 3, which concavity extends from the pointed end toward the driving end 4. At the driving end the peg is preferably provided with a head 5 to receive the blows of a tool while driving the peg into the ground, so as to avoid damaging the peg while driving it. This head 5 is located at what might be termed the "upper end" of the stem. Adjacent the head the peg is provided with a laterally-projecting arm 6, which is also curved, and in the devices shown in Figs. 3 and 4 this arm projects laterally and away from the concave side of the stem. At the outer end this arm 6 is provided with a loop or hook 7, which extends vertically at 8 and then bends or curves over the arm, with its end 9 pointing downwardly. Between this loop or hook 7 and the driving-head 5 the curved arm is provided with a hook 10, which is curved backward toward the head. The latter hook extends in a direction lengthwise with respect to the curved arm, while the loop or hook 7 at the end of said arm extends crosswise thereof, as clearly seen in Fig. 4.

In the peg shown in Fig. 2 the curved stem 11 has a rib 12 extending lengthwise thereof at the side opposite the concavity, and the curved arm 13 projects laterally from the driving-head 14, but from the ribbed side of the stem. This curved arm also extends upwardly and is provided at its upper end with a loop or hook 15.

The peg shown in Figs. 3 and 4 is better adapted for securing the lower edge of the vertical wall 16 of the tent 17 down on the ground, as seen in Fig. 1, and when in use the rope 18, attached to the lower edge of the tent-wall, is passed beneath the loop or hook 7 at the end of the lateral arm and secured around the hook 10 adjacent the driving-head. By this arrangement when the peg is driven in the ground the strain of the rope on the peg will be overcome by the earth at a concave side of the stem, and the pull is not a direct outward one. Consequently the peg will withstand strains that will easily draw pegs where the pull is direct.

The peg shown in Fig. 2 is better adapted for the guy-ropes 19 of the tent, which are attached to the hook 15, so that the strain will be overcome by the earth at the concave side of the stem.

Pegs formed in accordance with my invention will be strong and durable, may be easily driven in or removed from the ground, and by providing the lateral arms, so that the pull will be indirect, will withstand great strains.

Having thus described my invention, what I claim as new, and desire to secure by Letters Patent, is—

1. A tent-peg having a stem with a driving-head at its upper end and having an arm that projects laterally from the stem and away from the driving-head and the extreme end of said laterally-projecting arm having a downwardly-turned hook.

2. A tent-peg having a curved stem with a driving-head at the upper end thereof and also having a laterally-projecting arm with a loop formed at the end thereof and in a plane above the arm and said arm also having a loop between its end and the stem.

In testimony whereof I affix my signature in presence of two witnesses.

JOSEPH EMORY GORRELL.

Witnesses:
 CHARLES B. MANN, Jr.
 G. FERDINAND VOGT.